United States Patent [19]
Garwin

[11] 3,878,518
[45] Apr. 15, 1975

[54] METHOD AND APPARATUS FOR LINEARLY AMPLIFYING THE DEFLECTION OF A DROPLET OF A LIQUID MAGNETIC STREAM

[75] Inventor: Richard Lawrence Garwin, Scarsdale, N.Y.

[73] Assignee: International Business Machines Corporation, Armonk, N.Y.

[22] Filed: Feb. 4, 1974

[21] Appl. No.: 439,495

[52] U.S. Cl. ............................... 346/1; 346/75
[51] Int. Cl. ............................... G01d 15/18
[58] Field of Search ............... 346/75, 140, 1

[56] References Cited
UNITED STATES PATENTS

| | | | |
|---|---|---|---|
| 3,287,734 | 11/1966 | Kazan | 346/75 X |
| 3,510,878 | 5/1970 | Johnson | 346/75 X |
| 3,714,928 | 2/1973 | Taylor | 346/75 X |
| 3,805,272 | 4/1974 | Fan et al. | 346/75 |

OTHER PUBLICATIONS

Findlay et al., Magnetic Coil Droplet Sensitizer for Electrostatic Droplet Deflection, IBM Tech. Disc. Bulletin, Vol. 16, No. 3, Aug. 1973, pp. 794–795.

*Primary Examiner*—Joseph W. Hartary
*Attorney, Agent, or Firm*—Frank C. Leach, Jr.

[57] ABSTRACT

A static magnetic field is applied to a droplet of a magnetic liquid stream to linearly amplify any deflection applied to the droplet by a separate deflection means, which is synchronized with the formation of the droplets.

11 Claims, 2 Drawing Figures

METHOD AND APPARATUS FOR LINEARLY AMPLIFYING THE DEFLECTION OF A DROPLET OF A LIQUID MAGNETIC STREAM

In ink jet printing, a stream of ink is supplied under pressure and periodically interrupted to produce droplets, which impinge upon a suitable recording surface such as a sheet of moving paper, for example. To obtain printing on the paper by the ink, it is necessary that the droplets be spaced substantially uniform distances from each other, be of substantially uniform size, and be formed at a high rate such as about $10^5$ per second, for example.

It is necessary for the droplets to have substantially uniform spacing so that each droplet individually can be directed to the recording surface or deflected prior to reaching the recording surface in accordance with the pattern to be printed.

Various types of deflection means have been used to deflect the droplet. The amount of deflection of the droplet by the deflection means must be sufficient to prevent the droplet from reaching the recording surface. Furthermore, when the pattern to be printed requires the droplets to impinge at more than one point on the recording surface, the strength of the deflection must be varied. As a result, to obtain the necessary deflection of each droplet by the prior deflection means, a relatively large amount of power is required.

The present invention satisfactorily solves the foregoing problem through obtaining the desired deflection of the droplets of a magnetic liquid stream with a relatively low amount of power. The present invention does not require all of the deflection of the droplet to be produced initially by the deflection means. Instead, the present invention has the droplet receive only an initial deflection of its trajectory by deflection means, which requires power, and then relies upon a static magnetic field, which uses no power or very little power, to produce a linear or uniform amplification of the initial deflected trajectory of the droplet to deflect it to the desired position on the recording surface or to deflect it away from the recording surface.

In the prior devices in which the entire deflection of the droplet occurs within the deflection means, it is necessary that only one of the droplets be disposed within the deflection means at any time. Therefore, to obtain the necessary deflection of each of the droplets, the length of the deflection means through which each of the droplets passes must be small enough so that only one of the droplets is within the deflection means at any time. However, to obtain a sufficient deflection angle in a very short deflector requires high magnetizing power. If the power of the maximum (saturation) field is limited, then the droplet spacing must be increased to allow the use of a larger deflector. Furthermore, there must be sufficient time to change the magnitude of the signal to the deflection means for each of the droplets. As a result, the maximum speed of printing by the droplets of the stream is dependent upon the distance through which the droplet passes within the deflection means of the prior devices. In fact, the droplet spacing is always a small multiple of the droplet diameter and the deflection means is thus normally limited in length to about equal to the droplet diameter.

The present invention enables an increased speed of printing since the deflection means, which produces the initial deflection of the present invention, need only be relatively short in comparison with the previously available deflection means. This is because it is only necessary to produce an initial deflection of the droplet.

With the static magnetic field of the present invention employed to amplify the deflected trajectory of the droplet, more than one of the droplets of the stream can be within the static magnetic field at the same time. Therefore, the speed of printing can be substantially increased since adequate deflection may be obtained with the deflection means, which produces the initial deflection of the droplet and is relatively short in comparison with the prior deflection means, and it is only the deflection means in which only one of the droplets can be disposed at a time.

An object of this invention is to produce linear or uniform amplification of the deflection of each droplet of a magnetic liquid stream.

Another object of this invention is to produce faster printing by a magnetic liquid stream.

Still another object of this invention is to produce various deflections of the droplets of a magnetic liquid stream with relatively low power.

The foregoing and other objects, features and advantages of the invention will be apparent from the following more particular description of preferred embodiments of the invention as illustrated in the accompanying drawings.

Figure 1:
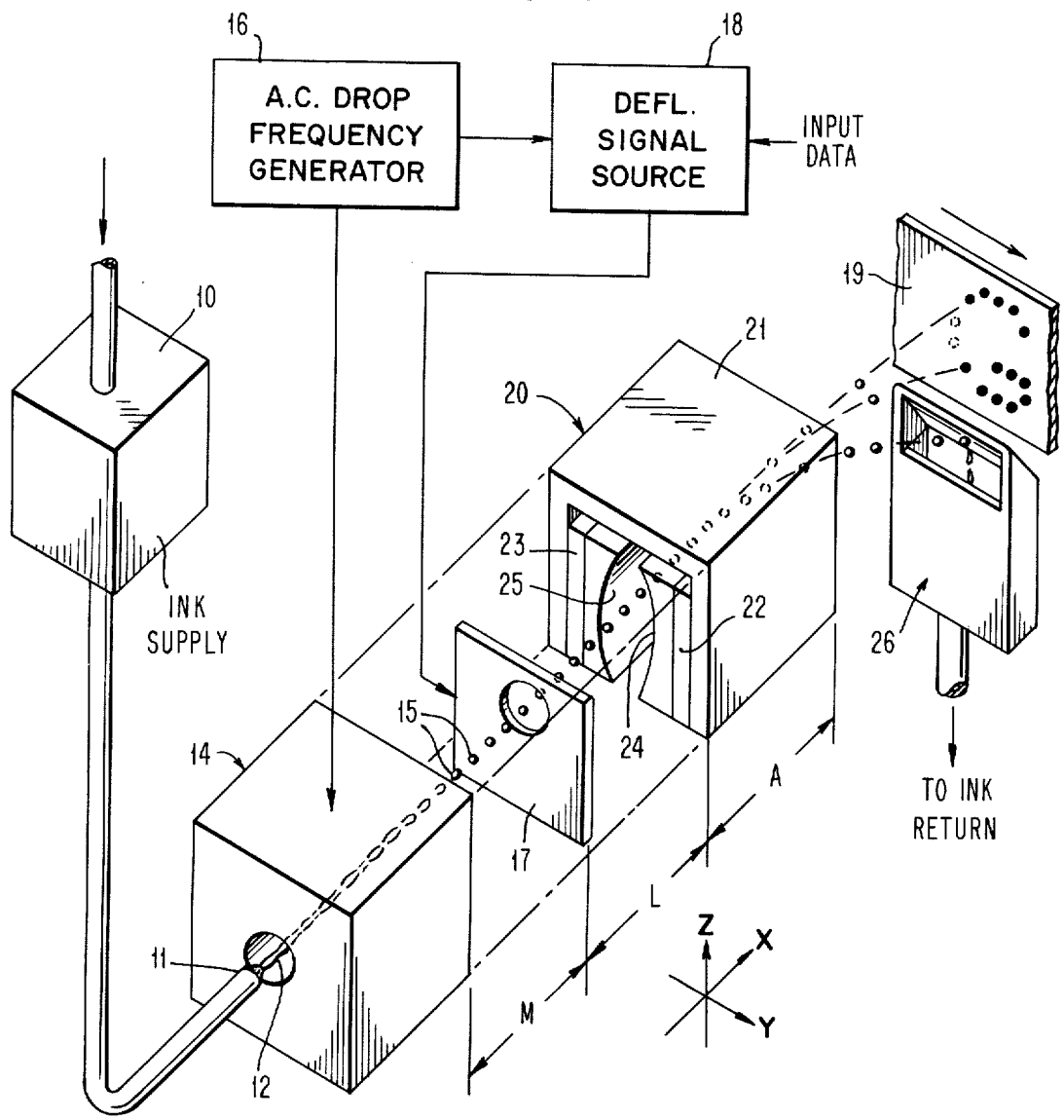
FIG. 1 is a schematic perspective view showing an ink recording arrangement having the amplifier of the present invention.

Referring to the drawing and particularly FIG. 1, there is shown an ink supply 10 from which magnetic ink is supplied under pressure such as 50 p.s.i., for example, to a nozzle 11. The magnetic ink may be of the types described in the copending patent application of George J. Fan et al. for "Method And Apparatus For Forming Droplets From A Magnetic Liquid Stream," Ser. No. 429,414, filed Dec. 28, 1973, and assigned to the same assignee as the assignee of this application.

A pressurized magnetic ink stream 12 issues from the nozzle 11 through an opening at the end thereof. As the stream 12 exits from the opening of the nozzle 11, it passes through an exciter 14, which may be any suitable means for forming droplets 15 from the stream 12 at substantially uniform distances from each other and of substantially uniform size. One suitable example of the exciter 14 is shown in the aforesaid Fan et al. application. Any other suitable means for forming the droplets 15 from the stream 12 may be utilized as the exciter 14.

When the exciter 14 is of the type shown and described in the aforesaid Fan et al. application, an AC drop frequency generator 16 is utilized to supply current to the coil of the exciter 14 in the manner more particularly shown and described in the aforesaid Fan et al. application.

After the droplets 15 are formed from the stream 12 by the exciter 14, each of the droplets 15 passes through deflection means 17, which is connected to a deflection signal source 18. The deflection signal source 18 supplies signals of varying strength to the deflection means 17 to cause each of the droplets 15 to be deflected in accordance with the desired pattern, which is to be printed on a recording surface such as a moving paper 19, for example. The deflection signal source 18 is synchronized with the AC drop frequency generator 16 so that the signals are supplied to the deflection means 17 when each of the droplets 15 is within the deflection means 17.

The deflection means 17 can be any suitable type of arrangement for causing deflection of each of the droplets 15 of the magnetic liquid stream 12. One suitable example of the deflection means 17 is shown and described in the copending patent application of George J. Fan et al. for "Recording System Utilizing Magnetic Deflection," Ser. No. 284,822, filed Aug. 30, 1972, now U.S. Pat. No. 3,805,272, and assigned to the same assignee as the assignee of this application.

The deflection means 17 produces an initial deflection of the trajectory of each of the droplets 15 of the stream 12 if such is required. Of course, if there is to be no deflection of the droplet 15 so that the droplet 15 is to continue in the substantially horizontal path from the exciter 14 until it is applied to the paper 19, then the deflection means 17 does not produce any deflection of the trajectory of the droplet 15. After leaving the deflection means 17, each of the droplets 15 passes through an amplifier 20, which has a length A from its entry to its exit.

As shown in FIG. 1, the deflection means 17 has its center disposed a distance L from the entrance to the amplifier 20 and a distance M from the exit of the exciter 14. The amplifier 20 is shown as having the length A. For clarity purposes, the deflection means 17 has been shown substantially spaced from both the exciter 14 and the amplifier 20 whereas the deflection means 17 is close to each. Thus, A is substantially greater than L or M such as being one hundred times greater, for example.

Accordingly, each of the droplets 15 travels the distance A in the $x$ direction through the amplifier 20. The $x$, $y$, and $z$ axes and directions are shown in FIG. 1 so that the deflection of the droplet 15 by the deflection means 17 is in the $z$ direction, either up or down.

The amplifier 20 includes a U-shaped yoke 21, which is formed of a soft magnetic material such as soft iron or ferrite, for example. The U-shaped yoke 21 has permanent magnets 22 and 23, which are formed of a hard magnetic material, supported on opposite side walls thereof.

The magnets 22 and 23 have soft iron pole faces 24 and 25, respectively. One of the pole faces 24 and 25 is a north pole and the other is a south pole.

The pole faces 24 and 25 have a concave shape symmetrical to the path of the stream 12 when it exits in the $x$ direction from the exciter 14. With the concave shape, the pole faces 24 and 25 are furthest apart at $z = 0$ and closest to each other at their top and bottom ends. Thus, the pole faces 24 and 25 create a magnetic field largely along the $y$ axis so that the magnetic field is primarily in a plane perpendicular to a plane containing the $x$ direction and the $z$ direction deflections of the droplets 15.

Because of the concave shape of the pole faces 24 and 25 of the magnets 22 and 23, respectively, the magnetic field has an increasing strength towards its ends even though applied largely along the $y$ axis. If the droplet 15 is not moving along the $z = 0$ plane, this increasing magnetic field strength in the $z$ direction causes acceleration of the droplet 15 in the $z$ direction in which the droplet 15 is displaced from the $x$ axis.

Thus, if the droplet 15 is displaced above the $x$ axis in the $z$ direction at entry into the amplifier 20, then the increase in strength of the magnetic field towards the upper ends of the pole faces 24 and 25 causes linear or uniform amplification of the droplet 15 in an upward direction from the time that it enters the amplifier 20 and throughout its movement through the amplifier 20 in the $x$ direction. Similarly, if the droplet 15 has been deflected by the deflection means 17 so that it enters the amplifier 20 below the $x$ axis in the $z$ direction, then the increase in strength of the magnetic field towards the lower ends of the pole faces 24 and 25 causes linear or uniform amplification of the droplet 15 in a downward direction from the time that the droplet 15 enters the amplifier 20 and throughout its movement through the amplifier 20 in the $x$ direction.

The initial displacement of the droplet 15 in the $z$ direction, either up or down, at the time that the droplet 15 enters the amplifier 20, the strength of the magnetic field, the angle of entry of the droplet 15 into the amplifier 20 (That is, the slope of its trajectory.), the length of the amplifier 20, and the angular amplification factor are all factors as to the amplification of the deflected trajectory of the droplet 15 by the amplifier 20. If there is no initial displacement of the droplet 15 and no angle of entry when the droplet 15 enters the amplifier 20, then there is no deflection at the exit.

After leaving the amplifier 20, the droplets 15 either strike the paper 19 or fall into a chute or gutter 26 from which the droplet 15 is returned to the reservoir of the ink supply 10. The droplets 15 are shown in FIG. 1 as striking the paper 19, which is moving to the right in FIG. 1, to form the letter G through deflections of various of the droplets 15.

Instead of forming a letter, for example, the droplets 15 could either be deflected to the gutter 26 or to the paper 19. Thus, each of the droplets 15 would have either a zero angle of entry or the same angle of entry each time so that this would allow on-off printing.

Because the magnetic field produced between the pole faces 24 and 25 is static, it always applies the same magnetic force on each of the droplets at the same location in the $x$ direction for a given distance in the $z$ direction. Therefore, more than one of the droplets 15 can be disposed in the amplifier 20 at the same time and each have its individual deflected trajectory amplified.

Accordingly, the minimum droplet spacing of the stream 12 is limited by only the length of the deflection means 17 and not by the length of the amplifier 20 since the velocity must be such to insure that only one of the droplets 15 is within the deflection means 17 at any time. Therefore, the maximum droplet rate of the magnetic liquid stream 12 is not as limited by the length of the deflection means 17 because of the relatively short length of the deflection means 17 in comparison with prior deflection means producing all of the deflection of a droplet.

Furthermore, because only an initial deflection is required from the deflection means 17, the power required to produce this deflection is much less than if all of the deflection were being produced by the deflection means 17. The permanent magnets 22 and 23 do not require any power.

While the permanent magnets 22 and 23 are preferred, it should be understood that a coil could be wrapped around the amplifier 20 and have current applied thereto to produce a magnetic field from the electromagnets formed thereby. While this arrangement would require some power, it is constant and steady. This power is significantly less than the power required by a deflection means, which produces all of the deflection of the droplet, since the power to this type of deflection means must be turned off and on for each droplet. This increases the power requirements.

Figure 2:
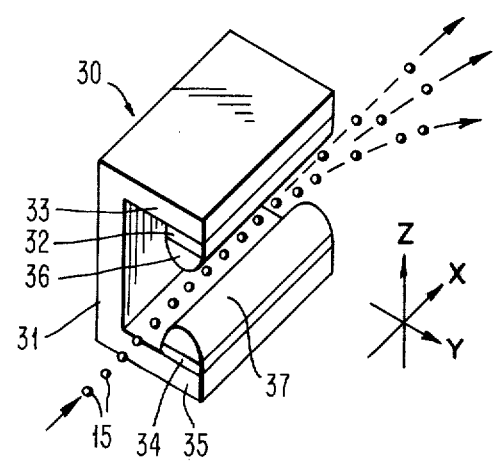
FIG. 2 is a perspective view showing another form of the amplifier of the present invention.

Referring to FIG. 2, there is shown an amplifier 30, which would be used in place of the amplifier 20 in the recording system of FIG. 1. The amplifier 30 includes a U-shaped yoke 31, which is formed of the same material as the yoke 21, having a permanent magnet 32 supported on the bottom surface of upper wall 33 of the yoke 31 and a permanent magnet 34 supported on the upper surface of lower wall 35 of the yoke 31. The magnets 32 and 34 are formed of a hard magnetic material.

The magnet 32 has a soft iron pole face 36, and the magnet 34 has a soft iron pole face 37. One of the pole faces 36 and 37 is a north pole, and the other of the pole faces 36 and 37 is a south pole.

The pole faces 36 and 37 have a convex shape symmetrical to the path of the stream 12 when it exits in the $x$ direction from the exciter 14. As a result, the pole faces 36 and 37 produce a magnetic field largely along the $z$ axis so that the field is primarily in the plane containing the $z$ direction deflections of the droplets 15.

The pole faces 36 and 37 are disposed the same distance in the $z$ direction from the $x$ axis. Accordingly, if the droplet 15 is disposed above the $x$ axis in the $z$ direction when it enters the amplifier 30, the magnetic field moves the droplet 15 towards the pole face 36. Similarly, if the droplet 15 enters the amplifier 30 below the $x$ axis in the $z$ direction, then the droplet 15 is attracted downwardly by the magnetic field.

The pole faces 36 and 37 of the amplifier 30 must be aligned so that the minimum distance therebetween is on a line passing through the $x$ axis and perpendicular thereto. This insures that there would be no deflection of the droplet 15 during its passage through the amplifier 30 if there has been no deflection of the droplet 15 by the deflection means 17. Thus, precise location of the pole faces 36 and 37 relative to the path of the stream 12 as it issues from the opening of the nozzle 11 is necessary. The path of the stream 12 is along the $x$ axis at this time.

The amplifier 30 produces a static magnetic field on each of the droplets 15 as the droplet 15 passes through the amplifier 30. The amplifier 30 also would have the length A, thus, the same amplification of the droplets 15 by the amplifier 30 occurs as discussed with respect to the amplifier 20.

The permanent magnets 32 and 34 of the amplifier 30 do not require any power in the same manner as the permanent magnets 22 and 23 of the amplifier 20. Similarly, the permanent magnets 32 and 34 could have a coil wrapped therearound so as to function as electromagnets in the same manner as described with respect to the magnets 22 and 23 of FIG. 1.

The following is an example of how the magnetic field, when it is largely along the $z$ axis as shown for the amplifier 30 in FIG. 2, has sufficient strength to produce linear amplification of each of the droplets 15 after it has been deflected to a selected trajectory by the deflection means 17. With the force applied to the droplet 15 when the magnetic field is largely along the $x$ axis being defined as $F_z$, $$F_z = k'z \tag{1}$$

where $k'$ is a constant and $z$ is the distance of the particle in the $z$ direction from the $x$ axis at any time during its movement through the magnetic field.

If $dH/dz$ indicates the rate of change in the $z$ direction of the magnetic field strength, which is H, and $u$ is the magnetic moment of the droplet 15 at any point $z$ along the $z$ axis, then equation (1) becomes $$F_z = u\,(dH/hz) \tag{2}$$

The strength of the magnetic field, H, at any point in the magnetic field in the $z$ direction is $$H = H_o\,[1 + (z^2/z_c^2)] \tag{3}$$

where $H_o$ is the strength of the static magnetic field along the $x$ axis, $z$ is as in equation (1) and defines the location of the droplet 15 at any time, and $z_c$ is a constant for the particular magnetic field and is approximately one half of the distance from the $x$ axis to the point of the pole face 36 and 37 closest to the $x$ axis. Accordingly, when taking the first derivative of equation (3) with respect to $z$, $$dH/dz = 2z/z_c^2\,H_o \tag{4}$$

The force on the droplet 15 at any point $z$ also is related to its mass, $m$, and its acceleration, $\ddot{z}$, so that $$F_z = ma \tag{5}$$

Equation (5) also can be written as $$\ddot{z} = F_z/m \tag{6}$$

where $\ddot{z}$ is the second derivative of $z$ with respect to time so as to denote the acceleration, $a$, in the $z$ direction.

If equation (2) is substituted for $F_z$ in equation (6) and $r = u/m$ where $r$ is the magnetic moment per unit mass of the droplet 15 so as to give the magnetization density of the droplet 15, then equation (6) becomes $$\ddot{z} = r\,dh/dz \tag{7}$$

The relationship between time, $t$, and distance or space in the $x$ direction can be expressed as $$dt = dx/v$$

where $v$ is the constant velocity of the droplet 15 in the $x$ direction. Thus, for the droplet trajectory, the partial derivative is $$d/dt = v\,(d/dx) \tag{9}$$

Applying equation (9) twice to $z$ results in $$z = v^2 (d^2z/dx^2) \quad (10)$$

By substituting equation (10) for $z$ in equation (7) and transposing $v^2$, $$d^2z/dx^2 = (r/v^2)(dH/dz) \quad (11)$$

If equation (4) is substituted for $dH/dz$ in equation (11), then equation (11) becomes $$d^2z/dx^2 = (r/v^2)(2z/Z^2)H_o \quad (12)$$

With $2H_o r/v^2 Z^2 = k$      (13)

equation (12) becomes $$d^2z/dx^2 = kz \quad (14)$$

with $k$ being the constant of equation (13).

The solution of equation (14) is $$z = ae^{cx} + be^{-cx} \quad (15)$$

where $a$, $b$, and $c$ are constants.

When the second derivative of equation (15) is taken with respect to $x$, this results in $$d^2z/dx^2 = c^2 ae^{cx} - c^2 be^{-cx} \quad (16)$$

If equation (16) is substituted in equation (14) for $d^2z/dx^2$ and equation (15) is substituted in equation (14) for $z$, then equation (14) becomes $$c^2 ae^{cx} + c^2 be^{-cx} = kae^{cx} + kbe^{-cx} \quad (17)$$

Solving equation (17) for $c$ results in $$c = k^{1/2} \quad (18)$$

With $c = k^{1/2}$, $z(o)$ representing the location of the droplet 15 in the $z$ direction at entry in the magnetic field of the amplifier 30, $z'(o)$ representing the slope of the droplet trajectory at entry, and the droplet 15 having begun its trajectory a distance of L prior to entering the magnetic field so that the distance to where the trajectory of the droplet 15 started is $-L$ as it is in the opposite direction to that in which the droplet 15 is traveling, the solution of equation (15) with $x = o$ (This defines the point of entry of the droplet in the magnetic field of the amplifier 30 in the $x$ direction.) results in $$z(o) = a + b \quad (19)$$

By measuring L to the center of the deflection means 17, an average of the deflection imparted to the droplet 15 by the deflection means 17 is obtained.

Since $z'(o)$ is the slope of the droplet trajectory at $x = 0$, then $$z'(o) = dz/dx \quad (20)$$

at $x = 0$ where $z = z(o)$. At $x = 0$, the slope, $z'(o)$, is defined by the tangent of the angle of the droplet trajectory as the droplet 15 has advanced from the point at which it began to be deflected by the deflecting means 17 until it entered the magnetic field of the amplifier 30 so that $$z'(o) = z(o)/L \quad (21)$$

Solving equation (21) for $z(o)$ gives $$z(o) = L z'(o) \quad (22)$$

Then, if equation (15) is substituted for $z(o)$ in equation (20) and the derivative of $z(o)$ with respect to $x$ taken, $$z'(o) = cae^{cx} - cbe^{-cx} \quad (23)$$

Substituting equation (15) for $z(o)$ in equation (22) and substituting equation (23) for $z'(o)$ in equation (22) results in $$Lcae^{cx} - Lcbe^{-cx} = ae^{cx} + be^{-cx} \quad (24)$$

Solving equation (24) with $x = 0$ results in $$Lc(a-b) = a + b \quad (25)$$

Solving equation (25) for $b$ results in $$b = (Lc - 1)/(Lc + 1) a \quad (26)$$

Substituting equation (26) for $b$ in equation (19) gives $$z(o) = a[(Lc - 1)/(Lc + 1) + 1] = a[(Lc - 1 + Lc + 1)/(Lc + 1)] = a[(2Lc)/(Lc + 1)] \quad (27)$$

Solving equation (27) for $a$ results in $$a = z(o)[(Lc + 1)/2Lc] \quad (28)$$

If equation (26) is solved for $a$ and substituted in equation (28), then solving equation (28) for $b$ results in $$b = z(o)[(Lc - 1)/2Lc] \quad (29)$$

If $z'(A)$ is the slope of the droplet trajectory at the exit from the magnetic field of the amplifier 30 and $F$ is the angular amplification in the magnetic field of the amplifier 30, then $$F = z'(A)/z'(o) \tag{30}$$

Thus, the angular amplification, $f$, is the ratio of the slope of the trajectory of the droplet 15 at the exit from the magnetic field to the slope of the trajectory at the entrance to the magnetic field.

Since $c$ and $A$ are fixed for any particular magnetic field because $c = k^{1/2}$, the $f$, a constant, can be defined as $$\ln f = ca \tag{31}$$

or $$f = e^{ca} \tag{32}$$

Since $A$ represents the location of the droplet 15 in the $x$ direction at the end of its travel through the amplifier 30 as $A$ is the length of the amplifier 30, then the slope of the trajectory of the droplet 14 at $x = A$ can be obtained by taking the derivative of equation (15) with respect to $x$ at $x = A$ so that $z'(A) = c (ae^{cA} - be^{-cA})$.

$$\tag{33}$$

Since $-be^{-cA}$ is very small because of the negative power, this can be dropped from equation (33); thus, substituting equation (32) in equation (33) results in $$z'(A) = acf \tag{34}$$

With $L$ being substantially smaller than $A$, then $Lc$ is substantially smaller than $Ac$. Thus, $Lc$ is substantially smaller than $\ln f$ and is substantially less than one. At $x = 0$, equation (23) becomes $$z'(o) = ca - cb \tag{35}$$

With $Lc$ substantially less than one so that $Lc$ in equation (26) can be ignored, then $b$ is approximately equal to $-a$ from equation (26) and substituting this relation in equation (35) results in $$z'(o) = 2ac \tag{36}$$

so that $$ac = z'(o)/2 \tag{37}$$

Substituting equation (37) in equation (34) results in $$z'(A) = z'(o)f/2 \tag{38}$$

From equation (30), $$z'(A) = Fz'(o) \tag{39}$$

so that substituting equation (39) for $z'(A)$ in equation (38) results in $$Fz'(o) = fz'(o)/2 \tag{40}$$

whereby $$F = f/2 \tag{41}$$

If an angular amplification of 5 is desired, then $F = 5$. Since $F = f/2$ from equation (41), then $f = 10$. Thus, from equation (31), $cA = \ln 10$ so that $$cA = 2.3 \tag{42}$$

If $A$ is assumed to be 1 centimeter, then $c = 2.3$ from equation (42) so that $K = 5.3$ since $k = c^2$.

If it is desired for $Z = 0.2$ cm, $v = 2 \times 10^3$ cm/sec, and $r$ equal approximately 40 emu/gram, then solving equation (13) for $H_o$ results in $$H_o = kv^2Z^2/2r = [5.3 \times (4 \times 10^6) \times 0.04]/(2 \times 40) = 10,000 \text{ gauss}.$$

If $A$ is increased to 2 cm, then $H_o = 2,500$ gauss. With either length of the magnetic field being reasonable, this is a reasonable strength of the magnetic field at the droplet entrance while producing a reasonable amplification of the slope of the droplet trajectory.

An advantage of this invention is that it reduces the power requirements for deflecting a magnetic ink droplet. Another advantage of this invention is that it enables the speed of printing by magnetic ink droplets to be increased.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of controlling the deflection of any selected droplet of a magnetic liquid stream including:
    separately deflecting each selected droplet from its initial path to produce a selected deflected trajectory of the droplet;
    and applying to each of the droplets a static magnetic field increasing substantially uniformly in strength in the plane of the deflected trajectory of the deflected droplet in each direction from the initial path of the droplets to amplify the deflected trajectory of the deflected droplet over a much greater distance of travel of the droplet in the direction of the initial path of the droplet than the distance of travel of the droplet in the direction of the initial path of the droplet in which it initially was deflected to the selected deflected trajectory.

2. The method according to claim 1 including applying the magnetic field primarily in the plane containing the directions of deflection of the droplets.

3. The method according to claim 1 including applying the magnetic field primarily in a plane substantially perpendicular to the plane containing the directions of deflection of the droplets.

4. An apparatus for controlling the deflection of any selected droplet of a magnetic liquid stream including:
means to deflect each selected droplet separately to produce a selected deflected trajectory of the droplet as the droplet exits from said deflecting means;
and means to amplify the deflected trajectory of the droplet after the droplet exits from said deflecting means, said amplifying means including a static magnetic field increasing substantially uniformly in strength in the plane of the deflected trajectory of the droplet in each direction from the initial path of the droplets prior to the droplets entering said deflecting means, said amplifying means having a length through which each of the droplets moves much greater than the distance from said deflecting means to said amplifying means.

5. The apparatus according to claim 4 in which said amplifying means includes means to produce a linear gradient magnetic field acting on each of the selected droplets in accordance with the slope of the trajectory of the droplet as it enters said amplifying means and the distance of the droplet relative to the initial path of the droplets in a plane substantially perpendicular to the initial path of the droplets.

6. The apparatus according to claim 4 in which:
said amplifying means includes means to produce a linear gradient magnetic field acting on each of the selected droplets in accordance with the slope of the trajectory of the droplet as it enters said amplifying means and the vertical distance of the droplet relative to the initial path of the stream of droplets prior to the droplet entering said deflecting means;
and the initial path of the droplets prior to the droplets entering said deflecting means is substantially horizontal.

7. The apparatus according to claim 4 in which said amplifying means includes a pair of permanent magnets having their pole faces spaced from each other and symmetrical to the axis of the initial path of the droplets prior to the droplets entering said deflecting means.

8. The apparatus according to claim 7 in which the pole face of each of said magnets is concave and disposed so that the pole faces are spaced from each other in a plane substantially perpendicular to the initial path of the droplets with the ends of the pole faces being closest to each other.

9. The apparatus according to claim 7 in which:
the pole face of each of said magnets is concave and disposed substantially vertically so that the pole faces are spaced horizontally from each other with their upper and lower ends being closest to each other;
and the initial path of the droplets prior to the droplets entering said deflecting means is substantially horizontal.

10. The apparatus according to claim 7 in which the pole face of each of said magnets is convex, the pole faces of said magnets being spaced an equal distance from the initial path of the droplets in a plane substantially perpendicular to the initial path of the droplets.

11. The apparatus according to claim 7 in which:
the pole face of each of said magnets is convex, the pole faces of said magnets being spaced an equal vertical distance from the path of the droplets prior to the droplets entering said deflecting means;
and the initial path of the droplets prior to the droplets entering said deflecting means is substantially horizontal.

* * * * *